W. R. GORDON.
AIR CRAFT.
APPLICATION FILED MAY 7, 1912.

1,103,195.

Patented July 14, 1914.
7 SHEETS—SHEET 4.

Witnesses
W. C. Stein
M. G. Lindsay

Inventor
William R. Gordon
by Alfred H. Hicks Atty.

W. R. GORDON.
AIR CRAFT.
APPLICATION FILED MAY 7, 1912.

1,103,195.

Patented July 14, 1914.
7 SHEETS—SHEET 7.

UNITED STATES PATENT OFFICE.

WILLIAM R. GORDON, OF KINLOCH, MISSOURI.

AIR-CRAFT.

1,103,195.  Specification of Letters Patent.  Patented July 14, 1914.

Application filed May 7, 1912. Serial No. 695,742.

*To all whom it may concern:*

Be it known that I, WILLIAM R. GORDON, a citizen of the United States, and resident of Kinloch, St. Louis county, Missouri, have invented certain new and useful Improvements in Air-Crafts, of which the following is a specification.

This invention relates to improvements in air crafts of the aerohydroplane type and has for its object a boat body in which is located the operating mechanism, a plane located above the entire device and planes projecting from the sides of the body, the said planes being suitably bent to support the craft in flying position and the mechanism so arranged in the body as to distribute the weight to the center of gravity.

A further object is to provide a craft of the type described with its working parts so arranged as to be absolutely under control by the operator, the entire weight being centralized so that the craft will maintain its equilibrium in the air as well as on the water and the working parts are so protected as to permit the craft to light and start in fields of uneven and shrubby surface without in any way injuring the device.

A further object of my invention is to provide an aerohydroplane with a body of a boat type located centrally with an upper plane and projecting side planes and to be operated by one or two motors with front and side propellers, and a mechanism for operating the propellers independently or simultaneously, and a proper rear steering device controlled by a mechanism within the body.

A further object is to construct an air craft having planes arranged in sections which can be readily and easily folded together for the purpose of making a compact bundle for shipping purposes without in any manner disturbing the machinery or working parts.

A further object is to provide a craft with an upper plane and projecting side planes having propellers located between the side planes as well as in the front of the body portion, the side propellers supported on hinged arms and exerting their pressure on a double-tree distributing the weight centrally in the body, or in other words at the center of gravity.

In the construction of my invention I provide a body portion 21 in the form of a boat and the skeleton frame work of said body is incased with a convex covering, the rear portion of the skeleton frame work tapering as indicated by the numeral 22 and is also incased by a fabric covering 23. Projecting from the point 24 is a support bar 25 on which is axially mounted the elevator or tail piece 26.

Figures 16, 18, 19:
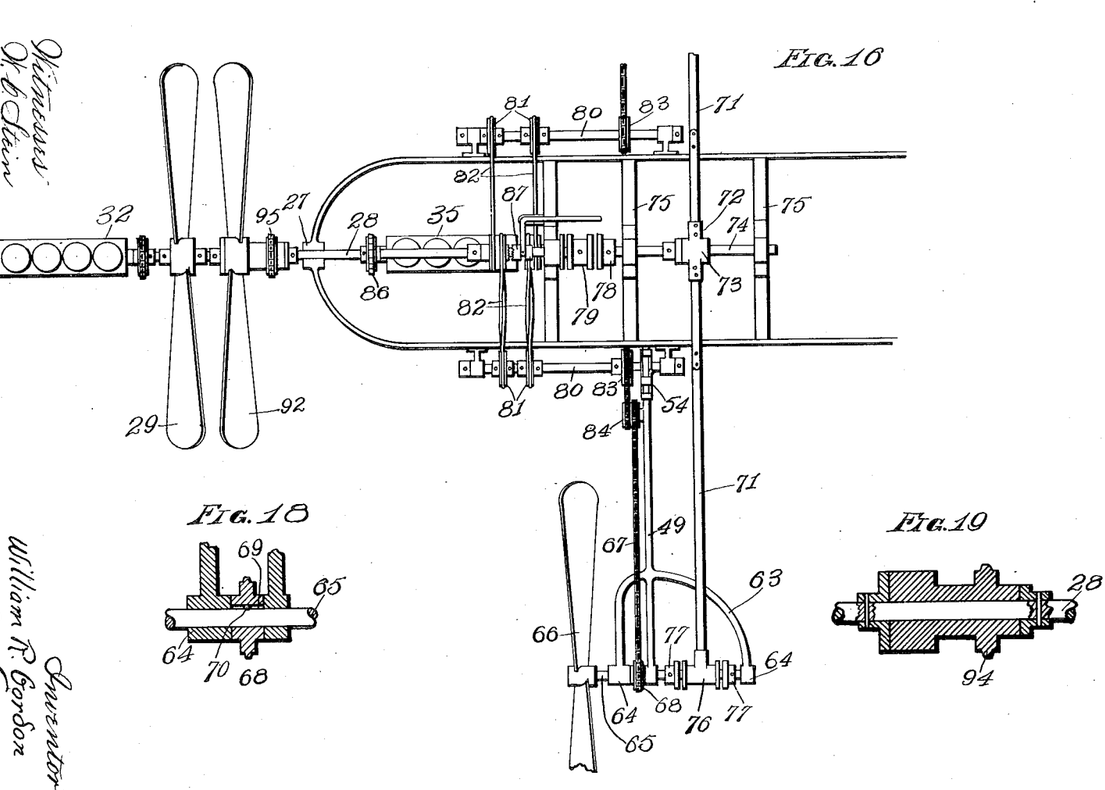
Fig. 16 is a detail view showing the position of the operating mechanism and their connections by which the propellers are operated, this view showing a double front propeller.
Fig. 18 is a detail sectional view of one of the side propeller shaft supports and the sprocket by which the same is driven.
Fig. 19 is a detail sectional view of the hub of the front loose propeller.
Figure 17:
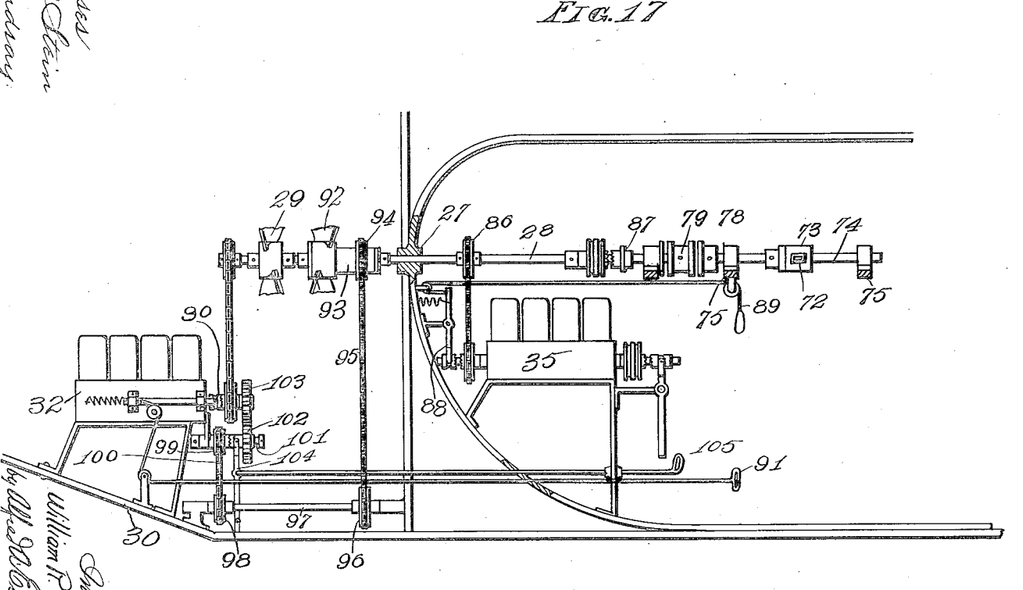
Fig. 17 is a side view of the same with parts in section.

On the forward end of the body is provided a suitable bearing 27 in which is located a shaft 28 and on said shaft in front of the body is located a propeller 29 and around this propeller and supported in a bow frame 30 is a housing 31 constructed of netting which acts as a protector for the propeller preventing articles from contacting therewith when the entire device is on the ground or when floating on the water. In the bow frame 30 is located a motor 32 and in front of the same a radiator 33. On the top of the body is located a fuel supply tank 34 from which the fuel oil is supplied to the motor through suitable piping and in the body portion is located a second motor 35 which also is supplied with fuel from the tank 34. The shaft 28 extends into the body portion and is supported in suitable bearings and said shaft is placed in rotation by means of the motor 35 or the motor 32, the motors may operate simultaneously or independently as desired. The operating mechanism by which the propellers are placed in operation will be fully hereinafter described and reference thereto will be had in Figs. 16 and 17.

Figure 1:
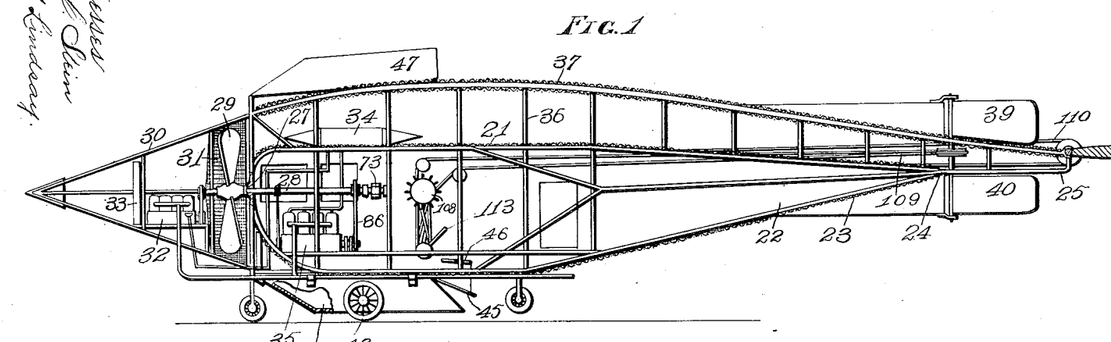
Figure 1 is a central sectional view of my invention.
Figures 3, 6:
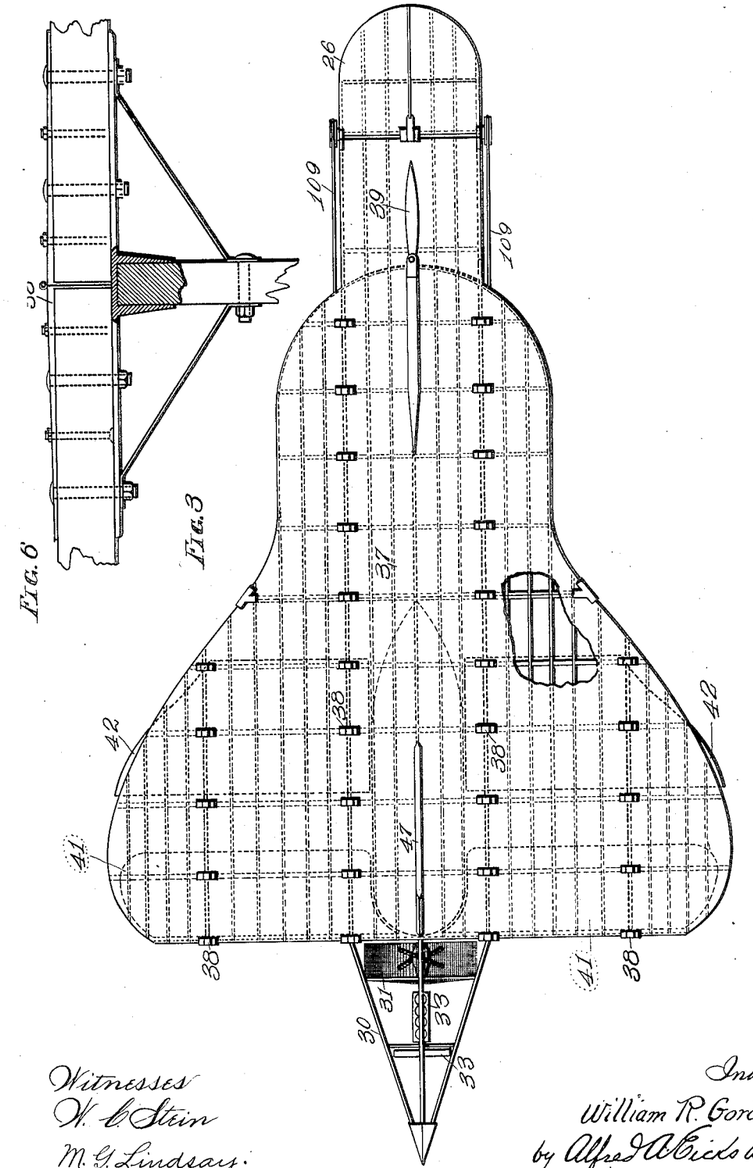
Fig. 3 is a top plan view with a part of the upper plane broken away showing the ribs of said plane.
Fig. 6 is a detail view of a portion of the plane frame.

On the frame of the body portion are located suitable braces 36 which project upwardly and on the same is mounted the upper plane 37 (see Figs. 1 and 3); this said plane is constructed as shown in the top view (Fig. 3) and is made in a plurality of sections each section connected together by the hinges 38, these hinges being of such construction as to hold the sections together rigidly, and the purpose of making the plane sectional is to permit the same to be folded together in order to make a compact bundle when desiring to ship the craft. On the rear portion of the craft are located steering rudders 39 and 40 one located above and one below the craft.

Figure 2:
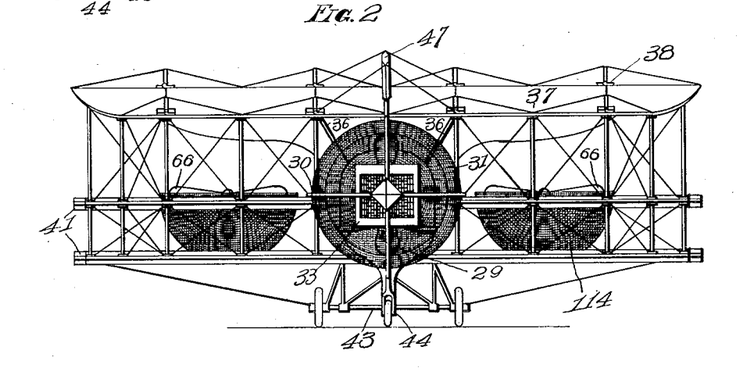
Fig. 2 is a front view of the same.
Figures 4, 13, 14, 15:
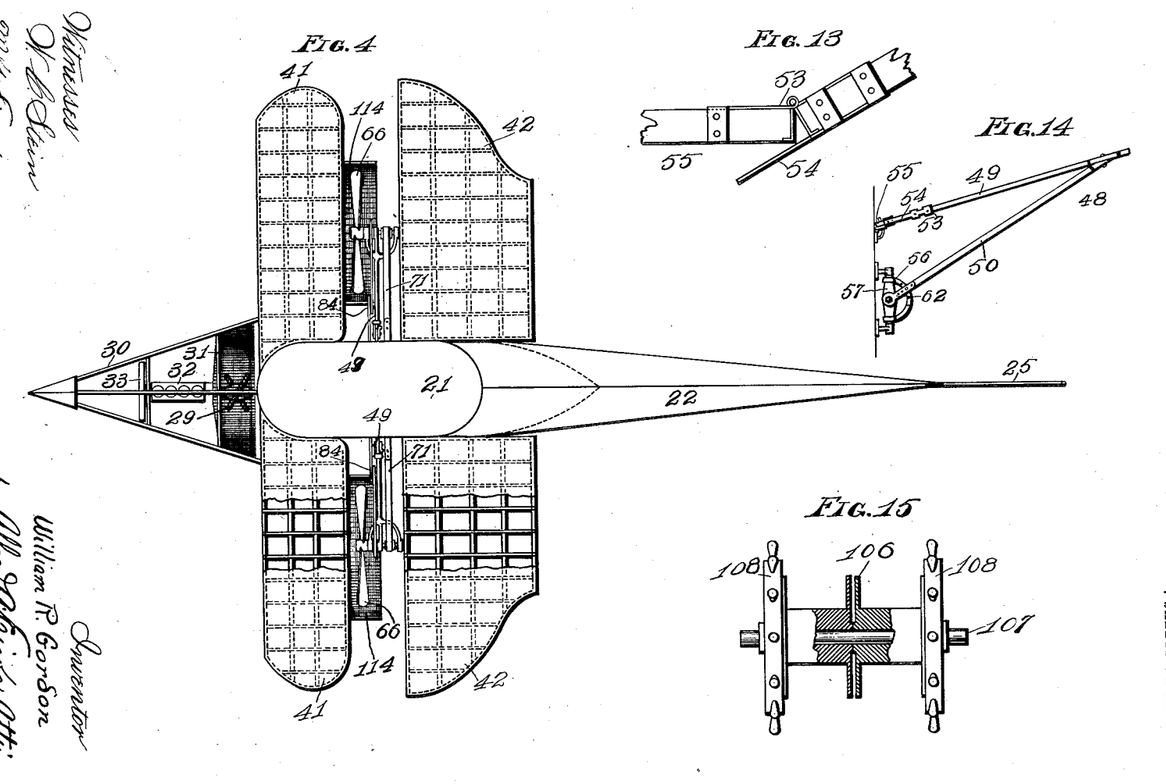
Fig. 4 is a top plan view with the upper plane, rudders, and elevator removed.
Fig. 13 is a detail view of the hinge made use of in the upper brace arm for permitting said arm to be folded against the body of the craft.
Fig. 14 is a side elevation of the side propeller brace showing its adjusting and pivotal connections.
Fig. 15 is a detail view of the drums made use of for operating the tiller ropes by which the steering mechanism is manipulated.
Figure 5:
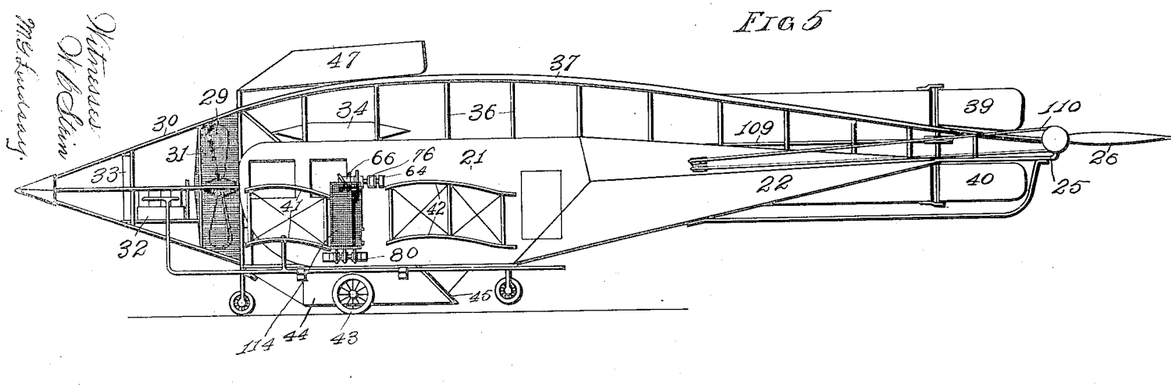
Fig. 5 is a side elevation of my invention.

Projecting from both sides of the body portion or boat are wings or planes 41 and 42, and arranged as shown in Figs. 4 and 5; the curvature of the side wings or planes as well as the top plane is such as to permit a given amount of air to lodge in the bowed portion of the planes, so that the craft can freely float and remain in the air similar to a parachute fashion. The planes are properly braced by guy ropes as shown in Fig. 2 so that said planes are supported rigidly when set in position and in order to prevent the same from buckling.

The entire craft is mounted on a suitable truck 43 and at the bottom of the boat and centrally of the truck is a hollow fin 44, the front portion thereof being closed while the rear portion is provided with a door 45 which can be operated from within the boat or body portion by means of the lever 46; on the top of the upper plane is located a fin 47; this fin and the hollow fin act as ailerons while the craft is afloat in the air and the hollow fin acting as a keel for the craft when the device is afloat in the water, and on such occasions the door 45 is opened to permit the hollow fin to fill with water and properly balance the craft, at the same time permitting the craft to glide over the water, acting as a hydroplane, the bottom surface of the lower wings supporting the craft on the surface of the water and in order to prevent these wings from becoming lacerated by floating objects the bottom surface is lined with light durable sheet material.

Figures 8, 12:
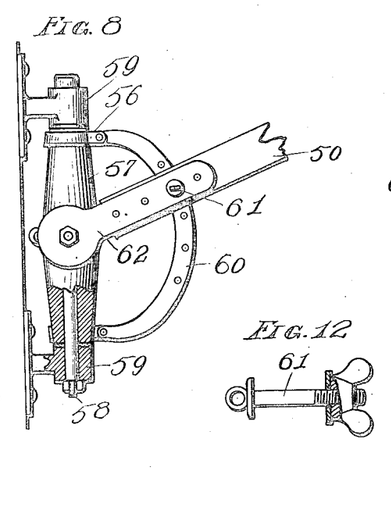
Fig. 8 is a detail side elevation with a part broken away and in section of the lower portion of the side propeller brace.
Fig. 12 is a detail view of the bolt made use of for supporting the brace arm in position upon the bracket.
Figure 9:
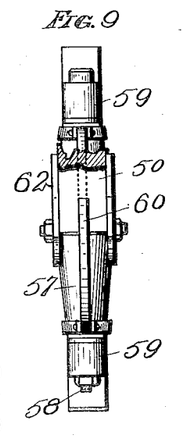
Fig. 9 is a front view of the same.
Figure 10:
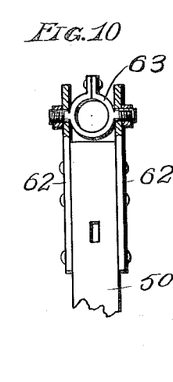
Fig. 10 is a detail top plan view of the propeller brace arm showing the swivel by which the same is supported.
Figure 11:
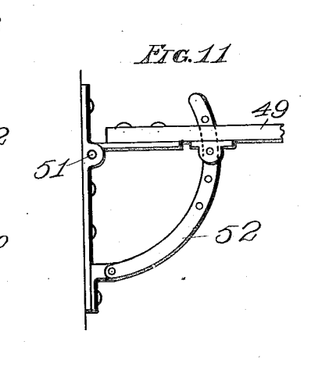
Fig. 11 is a detail side elevation of the bracket portion of the upper brace arm.

On the sides of the boat or body portion and between the projecting wings are located brackets 48 (see Fig. 14); these brackets consist of two members 49 and 50, the member 49 pivoted at the point indicated by the numeral 51 (see Fig. 11) and adjustably supported on a segment 52; this member in advance of the segment 52 is provided with a hinge 53 (see Fig. 13); the outer surface of the hinge is provided with a projecting plate 54 which contacts with the surface of the short arm 55 of the member 49 and is held firmly by means of a bolt passing through the plate and arms; the object of this hinge is to permit the brace to fold side-wise against the craft which is necessary when shipping the same; the bottom member 50 of the bracket is pivoted to a swivel-bracket 56 (see Fig. 8), this bracket consisting of a tubular member 57 mounted on a pin 58 supported in bearings 59 firmly secured to the body of the craft. On the tubular member is located a segment 60 which is perforated at intervals apart and over said segment straddles the base of the member 50 and held in proper tilted position by means of the bolts 61 passing through the same and the perforations in the segment. The base is provided with side plates 62 which support a sleeve 63 encircling the tubular member 57 and supported in a groove or depressed portion located in the center of the tubular member and of sufficient depth to properly support the sleeve and permit the bottom member 50 to operate side-wise in conformity with the member 49; by means of the segments the braces can be properly tilted and adjusted to bring the propellers which they support in proper horizontal alinement. The member 49 is slotted to allow the adjustment needed by the member 50 when the bracket is raised or lowered.

The free ends of the braces are provided with flaring arms 63 which are provided with bearings 64 in which operate the side propeller shafts 65. On these shafts are located side propellers 66 which are placed in rotation by means of the sprocket chains 67 operating over the sprocket wheels 68; these sprocket wheels are provided with keyways 69 in which project pins 70 extending from the propeller shafts 65; the object of this is to provide lateral movement to the shaft which lateral movement is exerted against a double-tree 71 extending across the craft from one side propeller shaft to the other and is centralized at the point indicated by the numeral 72, its bearing 73 mounted on a short shaft 74 supported in cross-bars 75. The free ends of the double-tree have bearings 76 through which the propeller shafts 65 rotate and on said shafts and on each side of the bearing 76 are rigid collars 77 which are arranged to contact with the collared ends of the bearings while the propellers are in rapid rotation exerting the lateral pressure against the double-tree and relieving the pressure from the braces and distributing the pressure centrally on the center bearings 73 in the body of the craft or in other words distributing the pressure at the center of gravity; the collars 77 are preferably of roller-bearing type so as to relieve the greater portion of friction. On the end of the shaft 74 which is centrally located in the body is a roller-bearing collar 78 which is designed to contact with a light collar 79 located on the center drive shaft 28; this mechanism is clearly shown in Fig. 16.

On the sides of the body portion are located counter-shafts 80 supported in suitable bearings and on said shafts are located pulleys 81, which are driven by belts 82 operated by the motor 35 located on the interior of the body portion. From the shafts 80 are driven the side propellers 66 through the medium of the sprocket wheels 83 communicating with the sprocket wheels 84 which are located on the braces by the medium of the chains 85. The drive shaft 28 is also driven from the motor 35 by means of the belt connection 86, and the motion imparted from the motor 35 to the drive shaft and counter-shafts is controlled by the clutch mechanism 87 so that the forward propeller and side propellers can be operated simultaneously or independently as the operator or engineer sees fit. The motor 32 which is located in the bow frame is what is termed an emergency motor and by said motor the entire mechanism can be operated independent of the motor 35 or the two can be operated simultaneously if found desirable.

Figure 7:
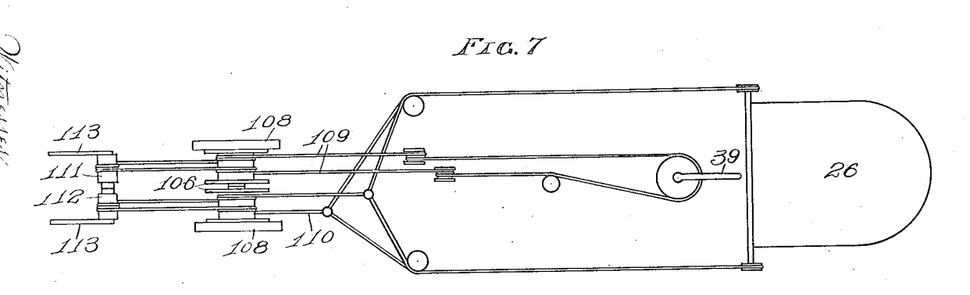
Fig. 7 is a diagrammatic view of the mechanism for operating the rear rudders and the elevator.

Motion from the motor 35 to the drive shaft 28 (see Fig. 17) is controlled by means of the clutch mechanism 88 thrown in and out of gear by the cord 89 and motion from the forward motor 32 to the drive shaft 28 is controlled by the clutch mechanism 90 operated by the lever 91. In this particular instance I show an additional propeller 92 which is loosely mounted upon the shaft 28, the hub 93 provided with a rigid sprocket 94 operating the propeller by means of the chain 95 passing over a sprocket 96 mounted on a counter-shaft 97; this counter-shaft being driven by the sprockets 98 and 99 connected by the chain 100, the sprocket 99 supported on a short shaft 101 which has a gear wheel 102 meshing with a gear wheel 103 located on the motor shaft of the motor 32 and motion by this mechanism to the loose propeller 92 is controlled by the clutch mechanism 104 operated by the handle 105 from within the body portion. By this arrangement the front propellers 29 and 92 can be rotated in opposite directions simultaneously or either one operated independently. On the interior of the body portion is located the controlling mechanism by which the rudders and elevator or tail piece are controlled; this mechanism consists of a double drum 106 (see Figs. 7 and 15); this double drum is located upon a shaft 107 and each drum can be independently operated by means of the pilot wheels 108. Over these drums operate the tiller ropes 109 for controlling the upper and lower rudders 39 and 40 and the tiller ropes 110 for operating the elevator or tail piece 26; these tiller ropes are wound around the drums and continued downwardly over drums 111 and 112 which can be operated by hand-levers 113 and the object of this mechanism is that the steering mechanism can be manipulated either by the pilot wheels or the hand-levers depending upon the position of the operator at the time when it is necessary to manipulate these steering devices.

The entire mechanism for the entire craft is controlled from within the body of the craft and all of the mechanical friction exerted by the operating parts of the various mechanisms is distributed to a given center so that the craft at all times has its proper equilibrium. The side propellers are also provided with gauze shields 114 which are designed to protect the propeller blades against contacting with floating objects when the device is floating in the water as well as to prevent shrubs from contacting with the blades whenever the device should alight in an open field with a shrubby uneven surface.

The purpose of constructing the upper plane in sections is to permit the plane to be folded to a narrow width for housing the craft as well as for the purpose of making a compact bundle when shipping the same.

Figure 20:
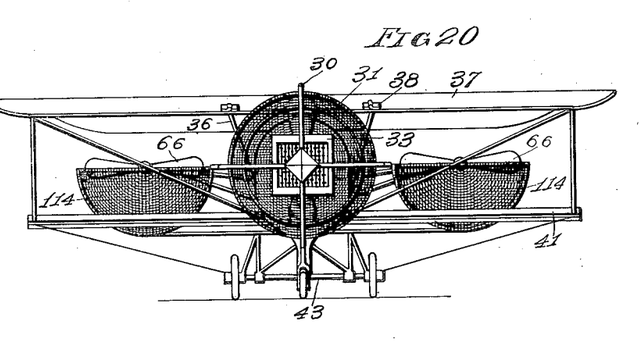
Fig. 20 is a front view of a modified form showing the device in the position of a biplane.

I may, if desired dispense with a part of the side wings on each side of the craft and convert the craft into either a biplane or monoplane as illustrated in Fig. 20 and by means of the bowed condition of the upper plane the craft will retain its proper equilibrium even though the operating mechanism should be at a standstill as the bowed portion of the plane acts as an air retainer or a parachute and will permit the craft to float steadily and lower itself at a mild speed. The several planes and parts which project from the body portion are suitably spaced by guy ropes or rods and the lowering and elevating of the craft is controlled by the elevator or tail piece 26 and the side movement by the rudders 39 and 40.

Having fully described my invention, what I claim is:

1. An air craft comprising a floating body mounted in a suitable frame, the operating and steering mechanism located within the floating body and divided to distribute the weight at a given center, a plane of hinged sections located above the body, and extending from the front of the body to the tail end of the frame, a steering rudder carried thereby, an elevator located to the rear of the rudder, a fin located on the top of the plane and at its forward end, a hollow fin located beneath the body and propellers located at the front and sides of the craft.

2. An air craft comprising a boat body, a plane located above the same and suitably bent and spaced away from the boat body, a fin located on the top of the frame, a hollow fin located on the bottom of the boat member, wings extending from both sides of the boat body, the said wings being suitably curved to assist in supporting the craft in floating position in the air, and propellers supported on projecting braces between the wings.

3. An air craft comprising a body suitably incased to stand the pressure of the air and to float upon the water, a single sectional plane forming the extreme top of the craft and attached to the body, the said plane suitably bent to retain the air, a plurality of bent wings extending or projecting from the sides of the craft, a pair of propellers projecting from the side of the craft and located between the wings, adjustable braces supporting the propellers upon the body of the craft, a double-tree extending the width of the craft for directing the thrust of the propellers to the center of the body portion, a motor for operating the propellers and a steering mechanism all operating from and mounted within the body of the craft.

4. An air craft comprising a body portion incased by a suitable covering, a motor and a steering mechanism located in the body portion and its weight arranged at the center of gravity, a propeller located in the front of the body, a top plane, side wings projecting from the body, propellers located between the side wings and means for directing their pressure to the center of gravity in the body and a hollow fin located beneath the body acting as an aileron for the craft when in the air and as a keel for the craft when in the water.

5. An air craft having an upper plane, a plurality of side projecting wings, propellers located in the front of the craft, a gauze shield for protecting the propellers, side propellers located between the side planes, gauze shields for protecting the side propellers, motors for operating the propellers simultaneously or independently, means for controlling the motors to operate simultaneously or independently, a rudder located on the plane, a rudder located beneath the body, an elevator located at the rear end, and means for operating the rudders and elevator for controlling the flight of the craft, and means for centralizing the exertion of the propellers along the central longitudinal line of the body for retaining the equilibrium of the craft, substantially as specified.

In testimony whereof, I have signed my name to this specification, in presence of two subscribing witnesses.

WILLIAM R. GORDON.

Witnesses:
ALFRED A. EICKS,
WALTER C. STEIN.